(12) United States Patent
Lesschaeve et al.

(10) Patent No.: US 7,448,761 B2
(45) Date of Patent: Nov. 11, 2008

(54) ARCHITECTURE FOR A PROJECTOR

(75) Inventors: Stefan Lesschaeve, Oudernaarde (BE); Krist Jacques Vandorpe, Beveren-Leie (BE); Nico Coulier, Zulte (BE); Peter Gerets, Roeselare (BE)

(73) Assignee: BARCO, naamloze vennootschap, Kortrijk (BE)

( * ) Notice: Subject to any disclaimer, the term of this patent is extended or adjusted under 35 U.S.C. 154(b) by 415 days.

(21) Appl. No.: 11/266,169

(22) Filed: Nov. 4, 2005

(65) Prior Publication Data

US 2006/0114429 A1   Jun. 1, 2006

Related U.S. Application Data

(60) Provisional application No. 60/631,431, filed on Nov. 30, 2004.

(51) Int. Cl.
*G03B 21/20* (2006.01)
*G03B 21/14* (2006.01)
*G02F 1/13357* (2006.01)

(52) U.S. Cl. ............................ 353/102; 353/98; 353/87; 349/62; 362/560

(58) Field of Classification Search ................... 353/20, 353/33, 37, 85–87, 100–102, 98; 349/61–62, 349/67; 362/559–561; *G03B 21/20*
See application file for complete search history.

(56) References Cited

U.S. PATENT DOCUMENTS

| 6,149,276 | A  | * | 11/2000 | Takeuchi et al. | ............... | 353/31 |
| 6,428,198 | B1 | * | 8/2002 | Saccomanno et al. | ........ | 362/559 |
| 2001/0026450 | A1 | * | 10/2001 | Li | ............................... | 362/298 |
| 2002/0176054 | A1 | * | 11/2002 | Mihalakis | ..................... | 353/31 |
| 2004/0165156 | A1 | * | 8/2004 | Akiyama | ..................... | 353/84 |

FOREIGN PATENT DOCUMENTS

| DE | 102 56 506 | 7/2004 |
| GB | 934650 | 8/1963 |
| WO | WO 03/021296 | 3/2003 |

OTHER PUBLICATIONS

Patent Abstracts of Japan, vol. 1996, No. 09, Sep. 30, 1996 & JP 08 124841 A (Cannon Inc), May 17, 1996, abstract.
Patent Abstracts of Japan, vol. 1995, No. 03, Apr. 28, 1995 & JP 06 331982 A (Fujitsu General Ltd), Dec. 2, 1994, abstract.

* cited by examiner

*Primary Examiner*—Andrew T Sever
(74) *Attorney, Agent, or Firm*—Bacon & Thomas, PLLC

(57) ABSTRACT

An improved architecture for a projector comprising a light source in the form of a lamp with a curved reflector with a distinctive focal distance for converging the light beam of the lamp; a so called cold mirror; an integration rod; a relay optics system consisting of a plurality of lenses followed by a light valve, wherein the architecture allows for the use of light sources with different focal distances.

9 Claims, 2 Drawing Sheets

ARCHITECTURE FOR A PROJECTOR

CROSS REFERENCE TO RELATED APPLICATION

The benefit of Provisional Application No. 60/631,431 filed Nov. 30, 2004 is claimed, and the entirety of said provisional application is incorporated herein by reference.

BACKGROUND OF THE INVENTION

1. Field of the Invention

The present invention relates to an improved architecture for a projector, in particular for a projector used for displaying images on a screen.

2. Discussion of the Related Art

The present invention relates to an architecture for a projector comprising a light source in the form a lamp, for example a xenon lamp, with a curved reflector with a distinctive focal number and focal distance for converging the light beam of the lamp; a so called cold mirror which reflects the visual light and transmits the infrared light; an integration rod; a relay optics system consisting of a plurality of lenses and a light valve such as a digital mirror device (DMD), a liquid crystal display (LCD), an LCOS or the like.

The architecture of known projectors is such that the cold mirror is placed in between the light source and the integration rod and that the entrance of the integration rod is at the focal point of the light source.

A disadvantage of a projector with such a known architecture is that it is suited for the use of only one kind of light source with a particular focal number.

Indeed, replacing the light source by another light source with for example a smaller focal number and repositioning the light source so that the focal point of the light source would coincide with the entrance of the integration rod, would result in a very small and intense light spot on the cold mirror and would hence result in locally damaging the cold mirror due to overheating and burning of the cold mirror or the coatings of this cold mirror.

SUMMARY OF THE INVENTION

It is therefore an objective of the invention to provide for an improved architecture of a projector which is not limited to the use of only one type of light source.

To this end the present invention provides for an improved architecture for a projector comprising a light source in the form of a lamp with a curved reflector with a distinctive focal distance for converging the light beam of the lamp; a so called cold mirror; an integration rod; a relay optics system consisting of a plurality of lenses followed by a light valve, wherein the architecture allows for the use of light sources with different focal distances.

An advantage of such an improved architecture is that one is not limited to only one kind of light source and to one supplier, but that one can choose amongst a larger number of light spots available on the market.

According to a first preferred embodiment, the cold mirror is situated between the light source and the integration rod and a condenser system is provided between the light source and the cold mirror at a distance from the light source which excels the focal distance of the light source, the condenser system being adapted for converging the light beam of the light source in such a way that the focal point of the converging light beam which is reflected on the cold mirror is located at or in the vicinity of the entrance of the integration rod.

An advantage of such a preferred embodiment is that by using such a condenser system, the light spot on the cold mirror can be made sufficiently large in order to limit the intensity of the light spot on the cold mirror and hence to avoid damage of the cold mirror by overheating.

Such a condenser system can be realized in a relatively inexpensive manner by two concentrically aligned bi-convex lenses.

Whenever a light source is replaced by another light source with a different focal distance, the condenser system is also replaced by a suitable condenser system which allows that the light source is fitted at the same spot in the projector as the light source which has to be replaced.

According to a second preferred embodiment the integration rod is placed after the light source with its entrance located at or near the focal point of the light source and the cold mirror is positioned behind the exit of the integration rod.

An advantage of this second preferred embodiment is that the light spot on the cold mirror is always nearly of the same size, irrespective of the focal distance of the light source used, so that when the light source is replaced by another light source with the same intensity but with a different focal distance, there is no risk that the light spot on the cold mirror becomes smaller and more intense, which could result in damaging the cold mirror by overheating.

The present invention also relates to a projector with an improved architecture as described.

BRIEF DESCRIPTION OF THE DRAWINGS

With the intention of better showing the characteristics of the invention, hereafter, as an example without any limitative character, a number of preferred embodiments of a projector with improved architecture according to the invention are described, with reference to the accompanying drawings, wherein.

DESCRIPTION OF THE PREFERRED EMBODIMENTS

Figure 1:
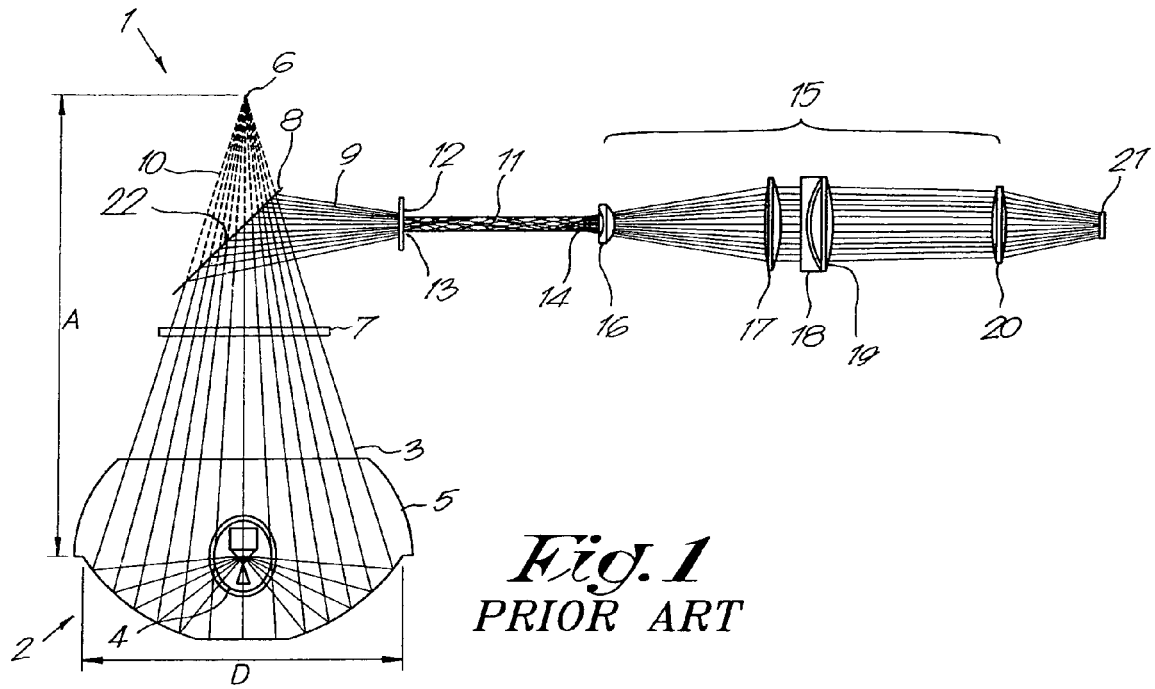
FIG. 1 schematically represents a prior art projector with known architecture.

The projector 1 represented in FIG. 1 is a prior art projector with a known architecture, comprising a light source 2 with a converging light beam 3, the light source 2 being composed of a lamp 4, preferably a xenon bulb lamp, and a curved reflector 5 with a particular focal point 6 of the converging light beam located at a focal distance A from the light source 2.

The projector 1 further comprises an ultraviolet filter 7; a so called cold mirror 8 which reflects the visual part 9 of the light beam 3 and transmits the infrared part 10; an integration rod 11 with an entrance 12 for the reflected light beam 9 positioned at or near the focal point 13 of the reflected light beam 9 and with an exit 14 for the light beam 9; followed by a relay optics system 15 composed of a plurality of lenses 16, 17, 18, 19 and 20 of which, in this case the lenses 17, 18, 19 and 20 are converging lenses; and finally a light valve 21 such as a digital mirror device (DMD), a liquid crystal display (LCD), an LCOS or the like, which serves as a valve for altering the incoming light beam 9 for projection of an image on a screen which is not represented in the figure.

The functioning of the projector 1 is as follows.

The converging light beam 3 which is generated by the light source 2 passes through the ultraviolet filter 7 and is projected on the cold mirror 8 which reflects the visual part 9 of the light beam 3 and transmits the infrared part 10 which is then removed from the optical path to protect the remaining optical elements 11, 16, 17, 18, 19, 20, 21 from heating.

The visual light beam 9 then passes the integration rod 11 and is then optically altered by the relay optics in order to feed the light valve 21 with an incoming light beam 9 with suitable characteristics for use as projection light.

The light spot 22 which is created by the light beam 3 on the cold mirror 8 is relatively large, so that the light energy is spread over a relatively large area and hence the temperature of the cold mirror stays reasonably low in order to avoid excessive heating of the cold mirror 8, in particular of its coatings.

A known projector 1, as represented in FIG. 1, is typically designed for a particular light source 2 with a particular focal distance A which is usually defined by the focal number, which is the ratio of the focal distance A to the diameter D of the reflector 5 (f=A/D).

Figure 2:
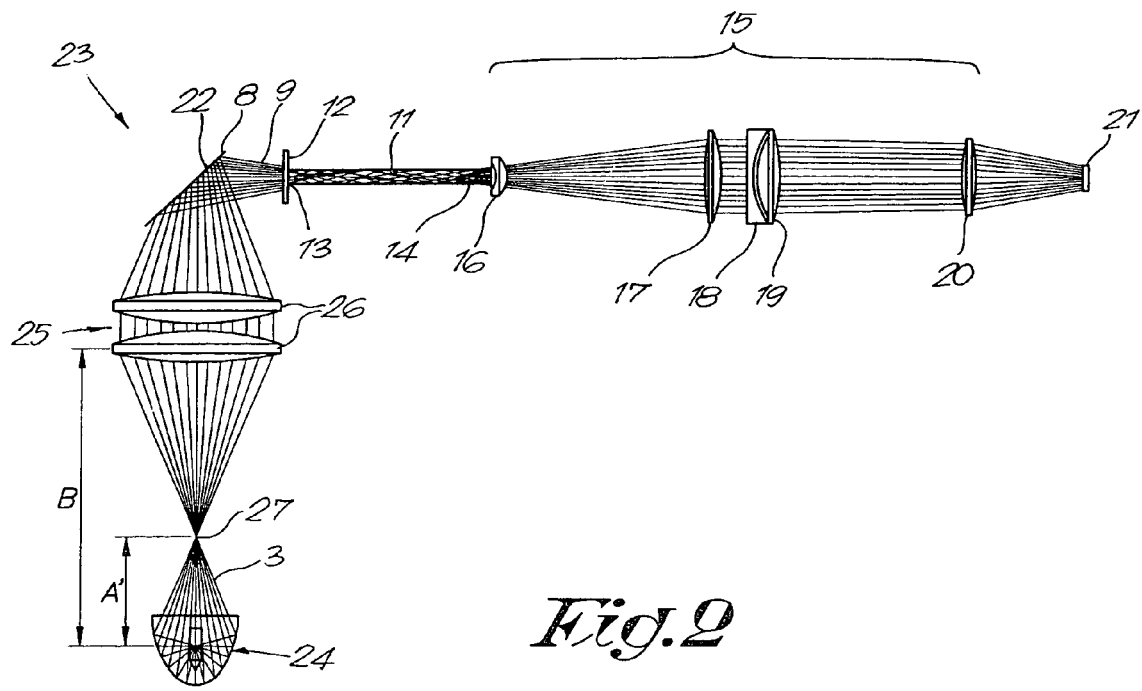
FIG. 2 represents a similar view as FIG. 1, but for a first preferred embodiment of a projector with an improved architecture according to the invention.

FIG. 2 represents a first preferred embodiment of a projector 23 with an architecture according to the invention, wherein a light source 24 is used with a focal distance A' which is smaller than the focal distance A of the light source 2 used in the projector 1 of FIG. 1.

This projector 23 according to the invention further comprises similar optical elements as the projector 1 of FIG. 1, more specifically a cold mirror 8, an integration rod 11, a relay optics system 15 which is composed of a plurality of lenses 16, 17, 18, 19 and 20; and a light valve 21.

Additionally this projector 23 is equipped with a condenser system 25 fitted in the light beam 3 of the light source 24 between said light source 24 and the cold mirror 8 and which is for example composed of a pair of two identical and concentrically aligned bi-convex lenses 26.

The condenser system 25 is provided at a distance B from the light source 23 which is larger than the focal distance A' of the light source 24 so that the light beam 3 generated by the light source 24 is convergent up to the focal point 27 of the light beam 3 and is divergent past this focal point 27 up the condenser system 25.

The diverging light beam 3 is then transformed by the condenser system 25 in a converging light beam which is projected on the cold mirror 8 and partially reflected in the visual spectrum and further focused up to the focal point 13 of the reflected light beam 9 situated at or in the vicinity of the entrance 12 of the integration rod 11.

By using a condenser system 25, the spot 22 of the light beam 3 on the cold mirror 8 can be larger than in case the light source 24 should be placed directly in front of the cold mirror 8 without condenser system 26 and in a position such that the focal point 13 of the reflected light beam would coincide with the entrance 12 of the integration rod 11.

This way damage to the cold mirror 8 or to the coatings of the cold mirror 8 can be avoided.

The condenser system 25 is matched to the light source 24.

Whenever the light source 24 has to be replaced by a light source with a different focal number, the condenser system 25 has to be removed or replaced.

When the light source 24 has to be replaced by a light source 2 as represented in FIG. 1, the condenser system 25 has to be removed, whilst when the light source 24 has to be replaced by a light source with a focal number different from that of the light sources 5 or 24, also the condenser system 25 has to be replaced by a condenser system 25 matched to the focal number of the light source to be fitted.

The condenser systems 25 matching with the different light sources to be used are preferably so designed that the light sources are always positioned at the same fixed spot in the projector 23 at a predetermined distance from the cold mirror 8.

The condenser system 25 does not necessarily have to comprise two lenses 26, but can also be made of only one lens or of a plurality of superimposed lenses.

The relay optics system 15 can also be of a different architecture than represented in the figures and comprise a different number and type of lenses.

Optionally, an ultraviolet filter can be fitted in front of the light source 24 between the light source and the condenser system.

The ultraviolet filter can also be realized as an ultraviolet reflective coating applied on the surface of the lens 26 nearest the light source.

Figure 3:
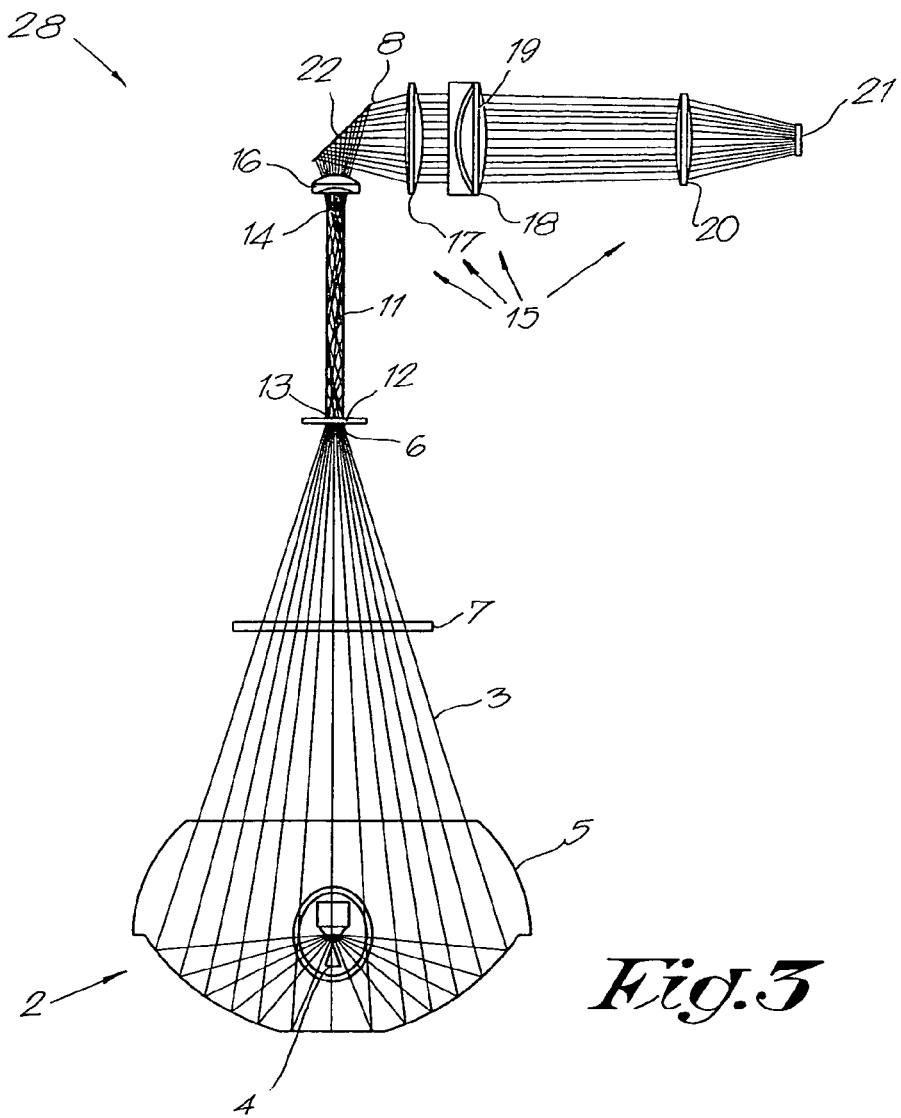
FIG. 3 represents a similar view as FIG. 2, but for a second preferred embodiment of a projector according to the invention.

FIG. 3 represents a second preferred embodiment of a projector 28 with an improved architecture according to the invention.

The projector 28 is composed of similar components as the projector 1 of FIG. 1, in particular a light source 2, an ultraviolet filter 7, an integration rod 11 which is placed after the light source 2 with its entrance 12 located at or near the focal point 6 of the light source 2, a relay optics system 15 composed of a plurality of lenses 16, 17, 18, 19, 20, a light valve 21 and a cold mirror 8, which, according to the invention, is positioned behind the integration rod 11 at a distance from the exit 14, in particular in this case after the first lens 16 of the relay optics system.

The integration rod and the first lens 16 are preferably made of fused silica in order to be able to resist the high intensity of infrared light.

Figure 4:
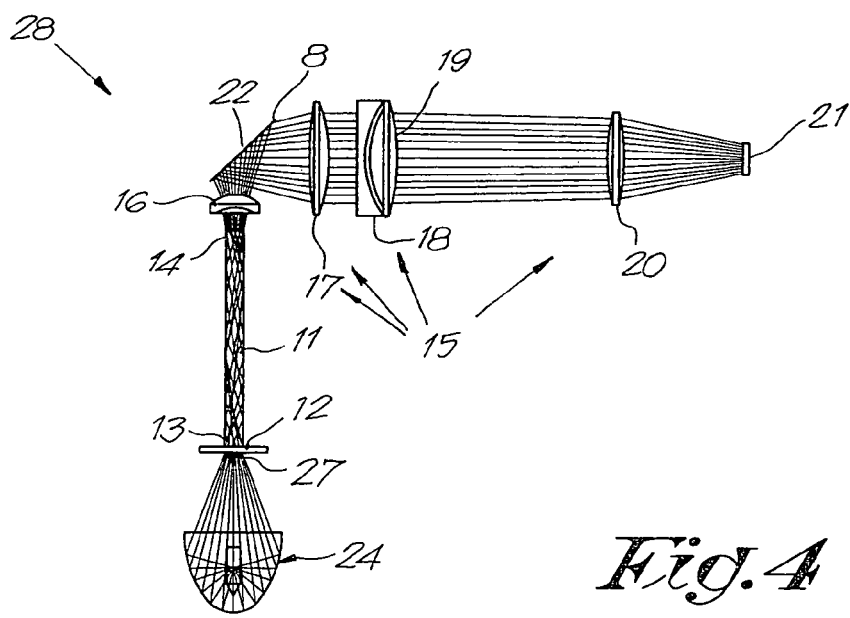
FIG. 4 represents the projector of FIG. 3, but with a different light source.

Whenever the light source 2 is replaced by a light source 24 with a different focal distance, the new light source 24 is positioned at a distance from the entrance 12 of the integration rod 11 which is equal, or approximately equal, to the focal distance A' of said light source 24, as is represented in FIG. 4.

The projector 28 can be fitted with adjustable means to fix the light source 24 at the appropriate focal distance from the integration rod 11.

As can be appreciated from the comparison of FIGS. 3 and 4, the area covered by the light spot 22 on the cold mirror 8 will be the same in both cases, so that, using a light source 24 with a similar light intensity as the light source 2 but with a different focal number, the light intensity on the cold mirror 8 will be nearly the same and hence there will be no risk of burning the cold mirror 8 when changing light sources.

From an optical point of view, it might be desirable to place the cold mirror 8 directly after the integration rod 11 or integrated in the relay optics system 15 with one or more of the lenses 16, 17, 18, 19 or 20 between integration rod 11 and the cold mirror 8.

The second preferred embodiment has the additional advantage over the first preferred embodiment that it is compacter and more efficient.

The present invention is in no way limited to the form of embodiment described by way of an example and represented in the figures, however, such an improved architecture for a projector according to the invention can be realized in various forms without leaving the scope of the invention.

The invention claimed is:

1. An architecture for a projector comprising a light source in the form of a lamp with a curved reflector with a distinctive focal distance for converging the light beam of the lamp; an integration rod; a cold mirror disposed between the light source and the integration rod; and a relay optics system comprising a plurality of lenses followed by a light valve and a condenser system disposed between the light source and the cold mirror, which condenser system is located at a distance from the light source and wherein the condenser system is adapted for converging the light beam of the light source in such a way that the focal point of the converging light beam which is reflected on the cold mirror is located at or in the vicinity of the entrance of the integration rod, wherein the architecture enables the use of light sources with different focal distances and wherein the condenser system comprises two concentrically aligned bi-convex lenses.

2. The architecture according to claim 1, wherein the condenser system comprises two identical lenses.

3. The architecture to claim 1, wherein for each of the light sources that can be used in the projector, a condenser system is provided which is arranged so that when using this particular condenser in combination with the corresponding light source, the light source is positioned at a fixed spot in the projector at a predetermined distance from the cold mirror.

4. The architecture according to claim 1, wherein an ultraviolet filter is provided between the light source and the condenser system.

5. The architecture according to claim 4, wherein the condenser system comprises a plurality of lenses and where the ultraviolet filter is provided as a ultraviolet reflective coating applied on the lens nearest the light source.

6. The architecture according to claim 1, wherein the integration rod is made of fused silica.

7. The architecture according to claim 1, wherein a lens is provided between the integration rod and the cold mirror, which lens is made of fused silica.

8. A projector with the architecture according to claim 1.

9. An architecture for a projector, comprising light source in the form of a lamp with a curved reflector with a distinctive focal distance for converging the light beam of the lamp; an integration rod which is placed after the light source with its entrance located at or near the focal point of the light source; a cold mirror which is positioned behind the exit of the integration rod; a relay optics system comprising a plurality of lenses followed by a light valve, wherein the architecture enables the use of light sources with different focal distances and wherein the position of the light source relative to the integration rod is adjustable so as to enable the focal point of different light sources having different focal distances to be located at or near the entrance of the integration rod.

* * * * *